(Model.)
W. H. SHIPMAN.
WINDOW REFLECTOR.
No. 269,125. Patented Dec. 12, 1882.
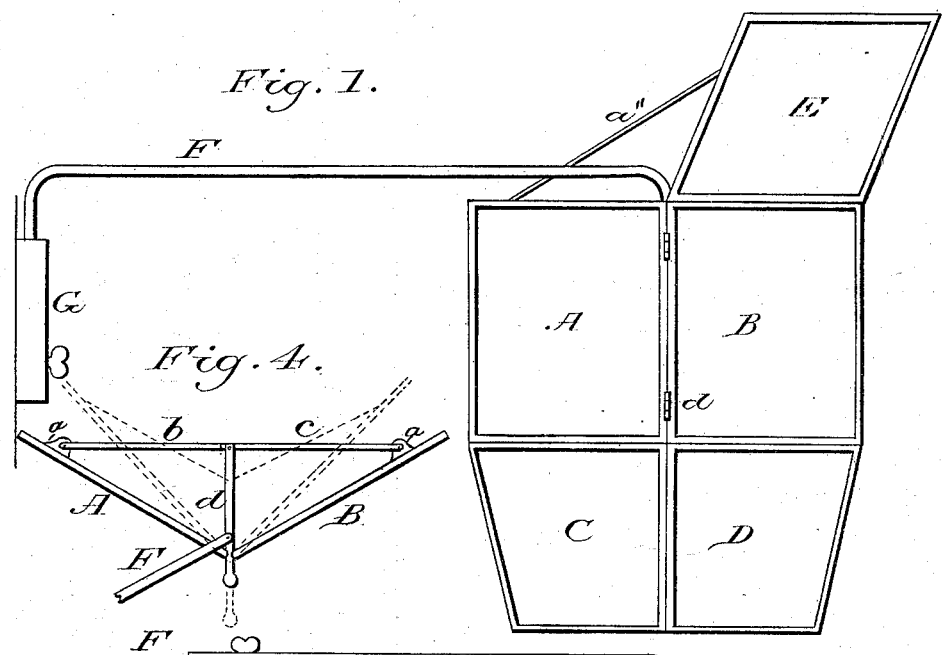
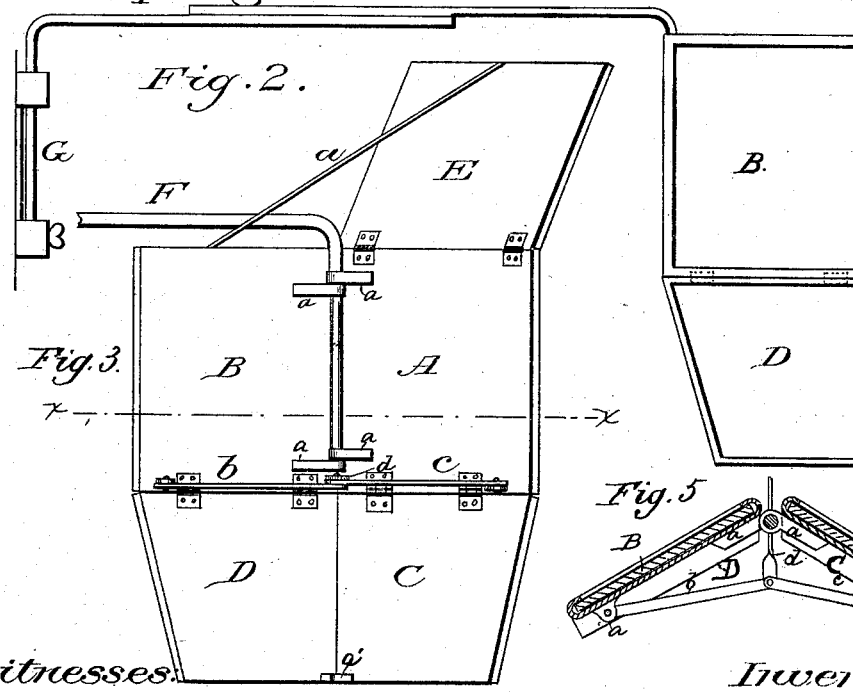
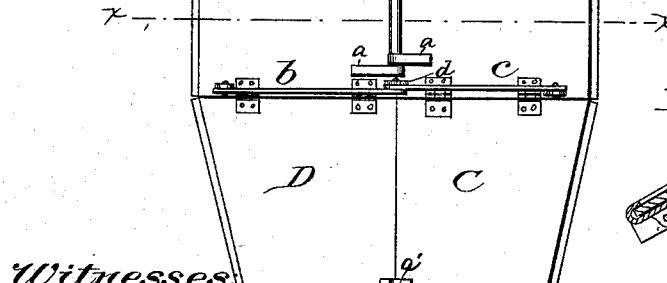
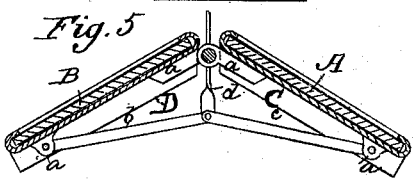
Witnesses: Inventor:
N. PETERS, Photo-Lithographer, Washington, D. C.

UNITED STATES PATENT OFFICE.

WILLIAM H. SHIPMAN, OF NEWARK, NEW JERSEY.

WINDOW-REFLECTOR.

SPECIFICATION forming part of Letters Patent No. 269,125, dated December 12, 1882.

Application filed January 18, 1882. (Model.)

*To all whom it may concern:*

Be it known that I, WILLIAM H. SHIPMAN, of Newark, in the county of Essex and State of New Jersey, have invented a new and useful Improvement in Window-Mirrors; and I do hereby declare that the following is a full, clear, and exact description of the same.

My invention is an improvement in the class of folding and adjustable mirrors which are adapted for use exteriorly to a window for the purpose of reflecting objects in the street or sidewalk, and thereby bringing them within the vision of a person inside the building.

The construction, combination, and operation of parts are as hereinafter described and claimed, reference being had to accompanying drawings, in which—

Figure 1 is a front view of device, showing the mirrors as they appear from within the room when adjusted for viewing objects in the street. Fig. 2 is a front view, showing the mirrors closed and swung in. Fig. 3 is a back view. Fig. 4 is a top view, showing two mirrors. Fig. 5 is a cross-section on line $x$ $x$ of Fig. 3.

The letters A B indicate the two principal mirrors, and C D E other mirrors, which are connected with the former, as hereinafter described. These mirrors are suspended by means of a rod, F, whose ends are bent at a right angle to the straight middle portion, thus forming vertically parallel arms. One of these arms enters a socket-piece, G, secured (in practice) to the window-casing or contiguous wall of the building, and the mirrors are hinged to the other arm, so as to be free to turn right or left, for the purpose of adjusting them in the required position—that is to say, the mirrors A B are provided with eyes $a$, Figs. 3, 4, at their contiguous inner edges, through which the rod F passes, as shown, thus forming a connection which is analogous to that of the ordinary door-hinge and pintle.

For the purpose of adjusting the rod F in length, it may be made in two parts, united by a clamp-screw, as in Fig. 2.

The mirrors C D are hinged together at $a'$, Fig. 2, and to the mirrors A B, respectively, so that they will swing laterally with the latter, as if made integral therewith—that is to say, the two mirrors A C move together, and the mirrors B D together. The mirrors A B are rectangular; but the mirrors C D are inclined on their inner sides to adapt them to hang at an angle inclined backward from the face of the upper mirrors, A B. For the purpose of adjusting these several mirrors, I provide a push and pull bar, $d$, and lateral arms $b$ $c$, as shown in Figs. 3 and 4. The arms $b$ $c$ are hinged to the outer edges of mirrors A B, respectively, and at their inner ends to the bar $d$. The latter passes through a slot formed by notching the contiguous edges of mirrors A B, Fig. 1, or through other suitable guide therefor. The mirror E is hinged to the upper edge of mirror B, and held inclined forward by means of a rod, $a''$, which serves not only as a brace but a means for adjusting the mirror.

The operation and function of the invention are as follows:

The object is to enable persons in the house to see what is transpiring on the street without protruding their heads from the window.
To this end the mirrors are placed with the apex of the angle toward the window, the swinging rod F serving as a means for adjusting them in the exact position required.

The pairs of mirrors A C and B D are capable of adjustment relative to each other from an angle of ninety to one hundred degrees, or angle between these. (See dotted lines, Fig. 4.) To adjust them the bar $d$ is pushed out or drawn back. For instance, to adjust the mirrors nearer each other, so as to take in a broader view of the street, the bar $d$ is drawn inward, thus causing the arms $b$ $c$ to draw the mirrors A C and B D toward each other, as shown in dotted lines, Fig. 4. Conversely, by pushing out the bar $d$ the mirrors will be adjusted at a greater angle to each other. There are therefore two adjustments—one of the pairs of mirrors A C and B D toward or from each other on the vertical outer arm of rod F as a center, and the other of the mirrors as a whole, which is effected by swinging them on or with the rod F to the right or left. The mirrors A B reflect objects which are farther off and the mirrors C D those which are nearer, they being inclined backward at a slight angle for this purpose. The upper mirror, E, reflects objects immediately beneath. It may be folded over in front against the mirror B, and the pairs of mirrors A C and B D will also fold flat back to back, which facilitates packing in small space.

What I claim is—

1. The combination, with the swinging rod F, of one or more pairs of mirrors, which are hinged together and to said rod, and the adjusting-bar $d$ and arms $b$ $c$, hinged thereto and to the mirrors, as shown and described, whereby the mirrors may be adjusted together in any position required and at any desired angle to each other, as specified.

2. The combination, with mirrors A B, hinged together, as specified, of the sliding bar $d$ and hinged arms $b$ $c$, as shown and described.

3. The combination of the two pairs of mirrors A C and B D, which are hinged together and to each other in the manner shown and described, and devices for holding them fixed in any adjustment by pairs, as set forth.

WM. H. SHIPMAN.

Witnesses:
A. D. SELOVER,
WM. W. TOWNSEND.